United States Patent Office 3,214,479
Patented Oct. 26, 1965

3,214,479
PROCESS FOR MAKING DICHLOROHEXA-
FLUOROBUTENE
Fred N. Teumac, Lake Jackson, and Lester W. Harriman, Angleton, Tex., assignors to The Dow Chemical Company, Midland, Mich., a corporation of Delaware
No Drawing. Filed Aug. 2, 1963, Ser. No. 299,471
4 Claims. (Cl. 260—653.1)

This invention concerns a process and catalysts materials for making dichlorohexafluorobutenes.

It is known to prepare dimers of chlorotrifluoroethylene by pyrolysis of polymeric chlorotrifluoroethylene, or by polymerizing chlorotrifluoroethylene by heating the same at elevated temperatures. The products are usually a mixture of cyclic or isomeric compounds.

It has now been found that chlorotrifluoroethylene can readily be converted to unsaturated dimers by reaction in contact with certain fluoro-containing catalyst materials as hereinafter described at elevated temperatures. It has further been found that the reaction is selective to obtain 3,4-dichlorohexafluorobutene-1, or 4,4-dichlorohexafluorobutene-1 as the principal product of the reaction and without the formation of higher solid polymeric products, when carried out in vapor phase and at atmospheric or substantially atmospheric pressure.

The catalyst materials to be employed in the reaction are solid polytetrafluoroethylene, preferably sintered porous polytetrafluoroethylene, i.e. finely divided polytetrafluoroethylene that has been pressed and sintered to form porous granules, chunks, sheets, discs, or blocks, of the same, and mixtures of sintered porous polytetrafluoroethylene and an alkali metal fluoride such as sodium fluoride or potassium fluoride. Such mixtures may consist of the porous polytetrafluoroethylene and the sodium or potassium fluoride in any and all proportions, but are preferably mixtures of from about 25 to 75 percent of the polytetrafluoroethylene and correspondingly from 75 to 25 percent of the sodium or potassium fluoride or a mixture of said alkali metal fluorides.

The process can be carried out at atmospheric or substantially atmospheric pressure by contacting vapors of the chlorotrifluoroethylene with the catalyst materials at reaction temperatures between about 300° C. and 450° C. for a reaction time of from about 0.05 to 5 seconds. The reacted vapors are cooled to condense and separate the liquid product from which the dimers are separated in usual ways, e.g. by distillation.

The following examples illustrate ways in which the principle of the invention has been applied, but are not to be construed as limiting its scope.

Example 1

Chlorotrifluoroethylene was fed into a 1 inch diameter by 24 inches long stainless steel tube and into contact with and through a sintered disc of porous polytetrafluoroethylene one inch in diameter by one-eighth inch thick positioned in a reaction zone in said tube and maintained at a temperature of 380° C. The contact time of the vapors of the chlorotrifluoroethylene with the porous polytetrafluoroethylene disc as catalyst material was about 0.1 second. The reaction was carried out at atmospheric pressure. The reacted vapors were cooled to condense and separate liquid product. There was obtained liquid product consisting of 92 percent by weight of 4,4-dichlorohexafluorobutene-1 boiling at 69.7° C. and 8 percent of higher boiling trimers of chlorotrifluoroethylene. No solid polymer was obtained.

Example 2

Chlorotrifluoroethylene was fed to a reaction zone and into contact with a catalyst material consisting of a porous sintered disc of a mixture of approximately equal parts by weight of polytetrafluoroethylene and potassium fluoride, at a temperature of about 425° C. and a contact time of about 0.1 second. The reacted vapors were cooled to condense and separate the liquid product. There was obtained a liquid product consisting of 91 percent by weight of 3,4-dichlorohexafluorobutene-1 boiling at 65.3° C. and 9 percent of higher boiling trimers. No solid polymer was obtained.

Example 3

Chlorotrifluoroethylene was fed to a reaction zone and into contact with a porous catalyst material, consisting of a sintered disc of a mixture of equal parts by weight of sodium fluoride and porous polytetrafluoroethylene, at a temperature of about 480° C. for a contact time of about 0.1 second. The reacted vapors were cooled to condense and separate liquid product. There was obtained a liquid product consisting of 94 percent by weight of 4,4-dichlorohexafluorobutene-1 and 6 percent of higher boiling liquid trimers. No solid polymer was obtained.

We claim:
1. A process for making dimers of chlorotrifluoroethylene, which comprises contacting vapors of chlorotrifluoroethylene with a catalyst material selected from the group consisting of polytetrafluoroethylene and mixtures of polytetrafluoroethylene and an alkali metal fluoride selected from the group consisting of sodium fluoride and potassium fluoride, at reaction temperatures between 300° and 450° C., cooling the reacted vapors to condense liquid product and separating dimers of chlorotrifluoroethylene from said liquid.
2. A process as claimed in claim 1 wherein the catalyst material is sintered porous polytetrafluoroethylene.
3. A process as claimed in claim 1, wherein the catalyst material is a mixture of sintered porous polytetrafluoroethylene and potassium fluoride.
4. A process as claimed in claim 1, wherein the catalyst material is a mixture of sintered porous polytetrafluoroethylene and sodium fluoride.

References Cited by the Examiner
UNITED STATES PATENTS
2,664,449  12/63  Miller _____ 260—653.1

LEON ZITVER, Primary Examiner.
DANIEL D. HORWITZ, Examiner.